W. M. SACK.
Measuring-Faucet.
No. 224,108.  Patented Feb. 3, 1880.
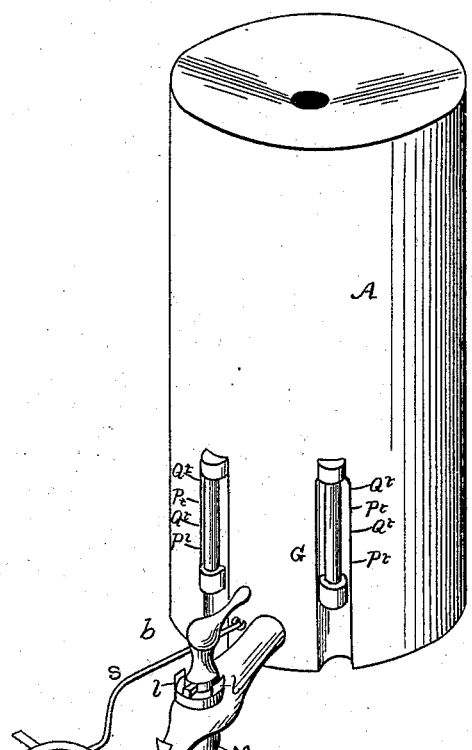
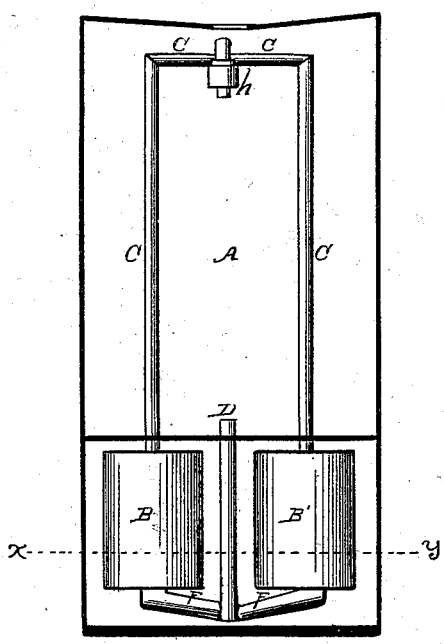
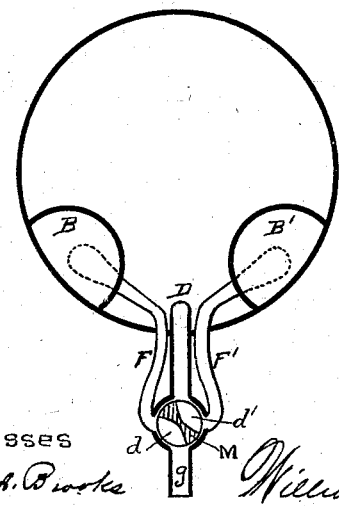
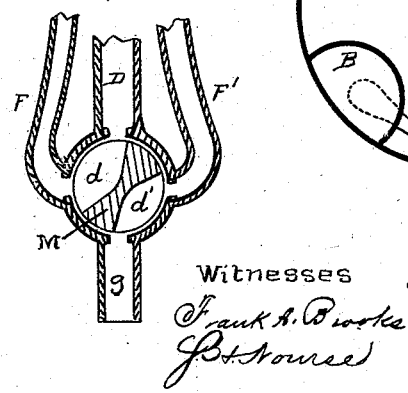
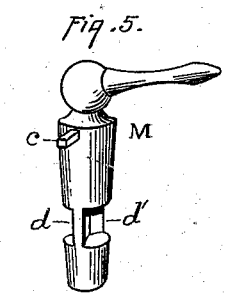
Witnesses  Inventor
Frank A. Brooks  William M. Sack
J. F. Nourse  By Dewey & Co.
  Attys

UNITED STATES PATENT OFFICE.

WILLIAM M. SACK, OF OAKLAND, CALIFORNIA.

MEASURING-FAUCET.

SPECIFICATION forming part of Letters Patent No. 224,108, dated February 3, 1880.

Application filed October 13, 1879.

*To all whom it may concern:*

Be it known that I, WILLIAM M. SACK, of Oakland, county of Alameda, and State of California, have invented an Improved Automatic Liquid-Measuring Faucet; and I hereby declare the following to be a full, clear, and exact description thereof.

My invention relates to certain improvements in faucets for automatically measuring liquids; and it consists in certain details of construction, especially a connecting air-pipe between the two measures, by which the air expelled by the liquid entering one is transmitted to fill the space in the one being emptied, as is more fully described in the accompanying drawings, in which—

Figure 1 is a perspective view of my device. Fig. 2 is a vertical section. Fig. 3 is a horizontal section through the line *x y*. Figs. 4 and 5 are details of construction.

The tank A is intended to hold a quantity of liquid of any kind, such as coal-oil, &c., which is to be measured out in small quantities of a pint, quart, two quarts, &c. Under the tank are two small measures, B B', of a capacity to hold two quarts or more each. These measures are connected by the continuous pipe C, reaching from the top of one up to the top of the main reservoir, and then down to the upper end of the other measure, for the purpose hereinafter described.

At the bottom of the main reservoir is a pipe, D, leading into the faucet. At the end of this pipe in the faucet is the valve or spindle M, having the cock or handle *b*, and controlling the openings of the pipes F F', which connect with the measures B B'. These pipes F F' are joined to the extreme bottom of their respective measures, and are flattened and tapering, as shown, in order that the entire contents of the measures may flow out of them through said pipes to the faucet.

The spindle or valve of the faucet has slots *d d'* on each side, the sides of said spindle or valve being chambered out, as shown, said chambers or slots not extending through, however, but having a diaphragm between them.

The openings of the pipes D F F' and the discharge-nozzle are all controlled by this four-way valve, as hereinafter described.

Connecting with both top and bottom of each measure is the glass gage G, in which the liquid may rise as it flows into the measure; and in the tank, beside these gages, are the graduated lettered marks "Pint," "1 quart," "Pint," "2 quarts," &c., so that the amount in the measure is accurately designated by its position in the gage.

On the upper part of the faucet is the lug *c*, which, by coming in contact with the offsets *l*, prevents the valve being turned past a certain point in either direction.

The operation of my device is as follows: When it is desired to draw off any of the contents of the tank, it must be drawn through either one of the measures B B'. Let it be supposed that the measure B is already filled up to its capacity, and it is desired to draw the whole two quarts off into a can or suitable receptacle. The handle of the can is hooked onto one of the hooks *f* on the faucet, and the cock is turned around until the lug strikes the offset. The oil or other liquid in the measure B may then flow out through the pipe F and out through the nozzle, the exact two quarts in the measure B flowing into the can; or, if only one quart is desired, the flow may be shut off when the quart has run out. In turning the faucet this operation is permitted, since the slot *d* in the spindle connects the opening of the pipe F with the discharge-opening *g*, thus allowing the liquid to pass through said pipe F and out into the can. As the faucet was turned to allow this oil to flow out of the measure B, the slot *d'* in the valve M connected the pipe D and pipe F', allowing the oil in the main tank to flow through said pipe F' into the measure B'. This oil flows down through the pipe D, and the position of the valves is such that the oil, flowing through said pipe, passes through the slot *d'* into the pipe F', and so into the measure B'. The same valve at the same time allows the oil already in the measure B to flow through the pipe F out of the faucet, through the discharge-opening *g*, into the receptacle, as described.

In order that the passage of the liquid into or out of the measures shall be free, the air-pipe C connects the two measures, as shown. As the measure B' is being filled the liquid entering it must displace the air, and this air rises through the pipe C, and then goes down and enters the measure B, from which the liquid is passing out. The air expelled from one measure by the entrance of the liquid thus passes into that from which the liquid is being drawn, and helps to force the latter out. In case there is not sufficient air it may come in through the air-valve $h$ on top of the pipe C.

When no liquid is being drawn the valve M closes both the pipe D and the discharge-opening $g$, both pipes F F' then also being closed, as the slots $d\ d'$ in the valve shut the openings. The liquid may be drawn from either one at will, according to the way the valve is turned.

At all times when liquid is being drawn out of one measure it will also flow into the other, except when said other one is full, and the state of the liquid in either measure is always denoted by its height in the gage.

A drip-cup, H, is hung on a swinging arm, $s$, so as to be under the opening of the faucet when the faucet is closed to catch any leak. The arm and drip-cup may be swung back when any liquid is to be drawn. The air in the gages is also allowed to escape and balance itself through the pipe C. The inwardly-opening valve in the pipe C also prevents said pipe ever acting as a siphon in case there was so much suction as to draw the liquid from one measure to the other through said pipe.

Having thus described my invention, what I claim as new, and desire to secure by Letters Patent, is—

1. In combination with the measures B B', the continuous air-pipe C, connecting said measures, arranged inside of and extending to nearly the top of the tank A, whereby the pressure in the tank, acting to fill the measure B, forces the air in said measure into the oppositely-placed measure B', to assist in discharging the liquid in said measure, substantially as herein described.

2. In combination with the air-pipe C, connecting the two measures B B', the valve $h$, whereby air is automatically supplied to said measures to replace loss, and siphonage from one to another is prevented, substantially as herein described.

In witness whereof I have hereunto set my hand.

WM. M. SACK.

Witnesses:
S. H. NOURSE,
FRANK A. BROOKS.